(12) United States Patent
Kimura et al.

(10) Patent No.: US 7,446,928 B2
(45) Date of Patent: Nov. 4, 2008

(54) MICRO-ELECTRO-MECHANICAL SYSTEMS ELEMENT ARRAY DEVICE AND IMAGE FORMING APPARATUS

(75) Inventors: Koichi Kimura, Ashigarakami-gun (JP); Shinya Ogikubo, Ashigarakami-gun (JP); Hirochika Nakamura, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/656,528

(22) Filed: Jan. 23, 2007

(65) Prior Publication Data
US 2007/0170151 A1 Jul. 26, 2007

(30) Foreign Application Priority Data
Jan. 23, 2006 (JP) ............................ 2006-013992

(51) Int. Cl.
*G02B 26/00* (2006.01)
*G09G 3/34* (2006.01)
(52) U.S. Cl. .................. 359/291; 359/224; 359/295; 359/298; 345/85; 345/108; 348/770; 348/771

(58) Field of Classification Search ................. 359/223, 359/224, 290–292, 295, 298, 316, 318, 320; 345/85, 108; 348/770, 771
See application file for complete search history.

(56) References Cited

U.S. PATENT DOCUMENTS
2002/0051053 A1* 5/2002 Kawai ........................ 348/771

FOREIGN PATENT DOCUMENTS
| JP | 6-124341 A | 5/1994 |
|---|---|---|
| JP | 8-334709 A | 12/1996 |
| JP | 10-48543 A | 2/1998 |
| JP | 2000-28937 A | 1/2000 |

* cited by examiner

*Primary Examiner*—Evelyn A. Lester
(74) *Attorney, Agent, or Firm*—Sughrue Mion, PLLC

(57) ABSTRACT

A micro-electro-mechanical systems element array device in which plural micro-electro-mechanical systems elements each having a movable portion are arranged in an array, said movable portion being to be displaced by a physical force which is generated by applying an electric signal to a conductive portion, and each of said micro-electro-mechanical systems elements drives and displaces said movable portion of said micro-electro-mechanical systems element on the basis of a displacement data for said micro-electro-mechanical systems element, wherein said device comprises: an electric signal generating unit as defined herein; a switching unit as defined herein; and a selecting unit as defined herein.

14 Claims, 8 Drawing Sheets

FIG. 4

LOGICAL TABLE (TRUTH TABLE) OF SELECTING CIRCUIT

| DATA OF IMAGE MEMORY | | SWITCH CONNECTED TO Va1 | | | | SWITCH CONNECTED TO Va2 | | | | EXTERNAL SIGNAL CONNECTED TO Va1, Va2 | |
|---|---|---|---|---|---|---|---|---|---|---|---|
| Vd(n−1) | Vd(n) | S1(A) | S1(B) | S1(C) | S1(D) | S2(A) | S2(B) | S2(C) | S2(D) | Va1 | Va2 |
| L | L | | | ON | | ON | | | | Vc(C) | Vc(A) |
| L | H | | ON | | | | ON | | | Vc(B) | Vc(D) |
| H | L | ON | | | | | | | ON | Vc(A) | Vc(C) |
| H | H | | | | ON | | | ON | | Vc(D) | Vc(B) |

Vc(A): SWITCH (FORWARD VOLTAGE)
Vc(B): SWITCH (REVERSE VOLTAGE)
Vc(C): STATE MAINTENANCE (FORWARD VOLTAGE)
Vc(D): STATE MAINTENANCE (REVERSE VOLTAGE)

$\Delta V1 < \Delta V2$ 　　$\Delta V1 = |Vb - Va1|$
　　　　　　　　　　$\Delta V2 = |Vb - Va2|$ $\Delta V1 > \Delta V2$ 　　$\Delta V1 = |Vb - Va1|$
　　　　　　　　　　$\Delta V2 = |Vb - Va2|$

MICRO-ELECTRO-MECHANICAL SYSTEMS ELEMENT ARRAY DEVICE AND IMAGE FORMING APPARATUS

This application is based on Japanese Patent application JP 2006-13992, filed Jan. 23, 2006, the entire content of which is hereby incorporated by reference, the same as if set forth at length.

FIELD OF THE INVENTION

The present invention relates to a micro-electro-mechanical systems element array device in which MEMS (Micro-Electro-Mechanical Systems) elements for controlling light, electricity, sound, fluid, or the like are arranged in an array, and to an image forming apparatus, and more particularly to a micro-electro-mechanical systems element array device such as: an optical modulation element array which is to be used in an on-demand digital exposure apparatus used in a photolithography step, an image forming apparatus such as a printing apparatus due to digital exposure, a projection display apparatus such as a projector, or a micro-display apparatus such as a head-mount display; an optical switching element array which is to be used in a cross-connector for optical communication, or the like; and a micro-electric switching element array which is to be used in an RF circuit or a multiplexer for multichannel signals, and to an image forming apparatus.

BACKGROUND OF THE INVENTION

Micro-electro-mechanical systems elements such as those disclosed in JP-A-8-334709, JP-A-2000-28937, JP-A-10-48543 and JP-A-6-124341 have been proposed, and an array device in which such micro-electro-mechanical systems elements are arranged in a one- or two-dimensional array has been put to practical use.

FIG. 6 is a view showing a configuration of two elements of a rotational displacement spatial light modulator (SLM) element array device which is an example of a micro-electro-mechanical systems element array device. A driving circuit (see FIG. 7) is formed in a semiconductor substrate 1, and movable mirrors 2, 3 are formed in a surface portion of the semiconductor substrate 1.

Each of the movable mirrors 2, 3 is doubly supported in the air by a hinge 6 bridged between support columns 4, 5 which upstand on the surface of the semiconductor substrate 1, so as to be laterally inclinable about the hinge 6. Movable electrode films 7, 8 are formed integrally with the hinge 6 on both sides of a hinge shaft, respectively. On the surface of the semiconductor substrate 1, stationary electrode films 9, 10 are formed at positions opposing the movable electrode films 7, 8.

Next, a rotational displacement optical modulation element (hereinafter, referred to as SLM) which is based on electrostatic driving, and which is typified by an SLM element will be described. FIG. 7 is a diagram of the SLM. In FIG. 7, the movable mirror 2 and the movable electrode films 7, 8 are shown as an integrated one member. A driving circuit 11 which supplies an address voltage Va1 to the stationary electrode film 10, and an address voltage Va2 to the stationary electrode film 9 incorporates a memory circuit. When a displacement data Vd based on, for example, an image data is written from an external circuit into the memory circuit, the driving circuit 11 produces and outputs the address voltages Va1, Va2 on the basis of the displacement data Vd.

FIG. 8 is a diagram illustrating the inclining operation of the movable mirror of the SLM element shown in FIG. 7. When a bias voltage Vb is applied to the movable mirror 2 (movable electrode films 7, 8), the address voltage Va1 is applied to the stationary electrode film 10, and the address voltage Va2 is applied to the stationary electrode film 9, between the movable mirror 2 and the stationary electrode film 10, a first electrostatic attracting force corresponding to the voltage difference $\Delta V1=|Vb-Va1|$ between the components is produced, and, between the movable mirror 2 and the stationary electrode film 9, a second electrostatic attracting force corresponding to the voltage difference $\Delta V2=|Vb-Va2|$ between the components is produced.

In the case where the second electrostatic attracting force is sufficiently larger than the first electrostatic attracting force, the movable mirror 2 is inclined to the right as shown in FIG. 8A, and, in the case where the first electrostatic attracting force is sufficiently larger than the second electrostatic attracting force, the movable mirror 2 is inclined to the left as shown in FIG. 8B. At this time, the movable portion stops in a noncontact state at a position where the elastic torque due to a beam balances with the electrostatic torque in the inclination direction. When the electrostatic torque in the inclination direction becomes larger than the elastic torque due to the beam, the movable portion displaces until it contacts with the stationary portion on the substrate, and stops at the position.

A light source 12 emits light 13 to the movable mirror 2. The case where reflected light from the right-inclined movable mirror 2 is directed toward a projection optical lens 14 is set to the ON state. When the movable mirror 2 is not in the right-inclined state and is in the left-inclined state, the reflected light deviates from the projection optical lens 14 (the OFF state). When many SLM elements which are arranged in an array are irradiated with light in a given direction, and right- and left-inclined states of each SLM element are controlled, therefore, an optical image based on an image data can be projected through projection optical lens 14.

SUMMARY OF THE INVENTION

When each element of the micro-electro-mechanical systems element array device is driven so that, for example, the movable mirror 2 is individually set to the state of FIG. 8A or 8B, or right-inclined (changed from the OFF state to the ON state), or left-inclined (changed from the ON state to the OFF state), the movable mirror 2 contacts with the stationary portion on the substrate, and stops at the position. A case where, depending on the inertia, elasticity, or viscosity of the structural dynamic system of the element, vibrations are produced at the stop occurs sometimes. Actually, the SLM stops while producing large vibrations.

In the above-described example, vibrations are produced when the movable mirror 2 is individually right-inclined (changed from the OFF state to the ON state), or left-inclined (changed from the ON state to the OFF state). Also in the case where the state of a movable mirror based on the displacement data is maintained or the former state is unchanged (OFF→OFF, or ON→ON), the movable mirror is temporarily displaced in the opposite direction (along which the movable mirror is separated from the contact position) by a driving voltage which is unwantedly applied to the corresponding element, and then returns to the original contact position. Also in this case, the movable mirror stops while producing vibrations (see JP-A-10-48543 and JP-A-6-124341).

In such state transition (OFF→ON, or ON→OFF), vibrations at the stop causes the following problems. Light reflected from the movable mirror may fluctuate. In the case of ON, the amount of the ON light is reduced, and, in the case of OFF, unwanted ON light is produced. Therefore, the quality such as contrast of an optical system to which the array device is applied is lowered.

In the case of the above-described SLM, the next displacement data cannot be written when vibrations have not sufficiently attenuate, and hence the cycle time of the optical modulation is prolonged. In the case where the SLM is applied to an exposure apparatus, therefore, the throughput time of the exposure process is prolonged, and, in the case where the SLM is applied to a projection display apparatus, a high-definition display is hardly conducted.

On the other hand, the above-mentioned unwanted vibrations which are produced in the state maintenance cause the following problems. Light reflected from the movable mirror may fluctuate. In the case of ON, the amount of the ON light is reduced, in the case of OFF, unwanted ON light is produced. Therefore, the quality such as contrast of an optical system to which the array device is applied is lowered.

There is also an optical modulation element which is of the rotational displacement type in the same manner as the SLM, but in which a movable mirror stops in a noncontact state. In a state where the elastic torque due to a beam of the optical modulation element balances with the electrostatic torque in the inclination direction, for example, the movable portion stops in a noncontact state. Also in this case, in the same manner as the case where the movable portion stops as a result of contact, vibrations are produced at the stop occurs depending on the inertia, elasticity, or viscosity of the structural dynamic system of the element. When overdamping is caused by high viscosity, vibrations are suppressed. However, the viscosity (the air viscosity or the like) is usually low. In most cases, therefore, the movable portion stops while producing vibrations.

In an element array in which variations of a driving voltage waveform is restricted in the same manner as the conventional art, in the case where the element structure or the displacement characteristic is improved, large restrictions must be imposed on design in order to obtain a driving voltage waveform for attaining a stable operation corresponding to the improved structure or characteristic. Namely, an arbitrary driving voltage corresponding to the structure or characteristic cannot be applied at an arbitrary timing.

It is an object of the invention to provide a micro-electro-mechanical systems element array device and image forming apparatus in which, as a driving signal waveform that is supplied to each element, and that is based on a displacement data, an arbitrary driving signal can be applied at an arbitrary timing.

It is another object of the invention to provide a high-quality and high-speed micro-electro-mechanical systems element array device and image forming apparatus in which vibrations that may be produced in state transition or state maintenance of a movable portion on the basis of a displacement data are suppressed.

It is a further object of the invention to provide a micro-electro-mechanical systems element array device and image forming apparatus in which an arbitrary driving signal corresponding to the improved structure or characteristic can be applied at an arbitrary timing, and improvements of the degree of freedom in design and stability of the operation are enabled.

The micro-electro-mechanical systems element array device of the invention is an array device in which plural micro-electro-mechanical systems elements each having a movable portion are arranged in an array, the movable portion being to be displaced by a physical force which is generated by applying an electric signal to a conductive portion, and each of the micro-electro-mechanical systems elements drives and displaces the movable portion of the micro-electro-mechanical systems element on the basis of a displacement data for the micro-electro-mechanical systems element, wherein the device comprises: an electric signal generating unit which is disposed commonly to the micro-electro-mechanical systems elements; a switching unit for, disposed for each of the micro-electro-mechanical systems elements, connecting/disconnecting the electric signal generating unit to/from the conductive portion of the micro-electro-mechanical systems element; and a selecting unit for, disposed for each of the micro-electro-mechanical systems elements, opening/closing the switching unit on the basis of the displacement data, thereby applying the electric signal from the electric signal generating unit to the conductive portion through the closed switching unit.

The conductive portion of the micro-electro-mechanical systems element array device of the invention comprises a first conductive portion for generating a physical force for displacing the movable portion to a first position, and a second conductive portion for generating a physical force for displacing the movable portion to a second position, and the switching unit comprises a first switching unit for connecting/disconnecting the first conductive portion to/from the electric signal generating unit, and a second switching unit for connecting/disconnecting the second conductive portion to/from the electric signal generating unit.

The electric signal generating unit of the micro-electro-mechanical systems element array device of the invention generates plural different control voltage signals, and applies the different control voltage signals to the first and second conductive portions.

The control voltage signals of the micro-electro-mechanical systems element array device of the invention have a signal waveform which suppresses vibration that is produced by the movable portion at the second position or the first position when the movable portion is displaced from the first position to the second position, or from the second position to the first position.

In the micro-electro-mechanical systems element array device of the invention, the physical force is an electrostatic force or an electromagnetic force.

In the micro-electro-mechanical systems element array device of the invention, the displacement data is an image data.

In the micro-electro-mechanical systems element array device of the invention, the micro-electro-mechanical systems elements are optical modulation elements.

The electric signal generating unit of the micro-electro-mechanical systems element array device of the invention is disposed commonly to at least micro-electro-mechanical systems elements of a same row.

The image forming apparatus of the invention comprises a micro-electro-mechanical systems element array device according to any one of the above descriptions.

According to the invention, as a driving signal waveform which is supplied to each element, and which is based on a displacement data, an arbitrary driving signal can be applied at an arbitrary timing. A high-quality and high-speed micro-electro-mechanical systems element array device and image forming apparatus in which vibrations that may be produced in state transition or state maintenance of a movable portion on the basis of a displacement data are suppressed. Furthermore, an arbitrary driving signal corresponding to the element structure or characteristic can be applied at an arbitrary timing, and improvements of the degree of freedom in design and stability of the operation are enabled.

BRIEF DESCRIPTION OF THE DRAWINGS

FIG. 4 is a view showing a logical table of selection which is performed by a selecting circuit shown in FIG. 1.

DETAILED DESCRIPTION OF THE INVENTION

Hereinafter, an embodiment of the invention will be described with reference to the accompanying drawings.

Figure 1:
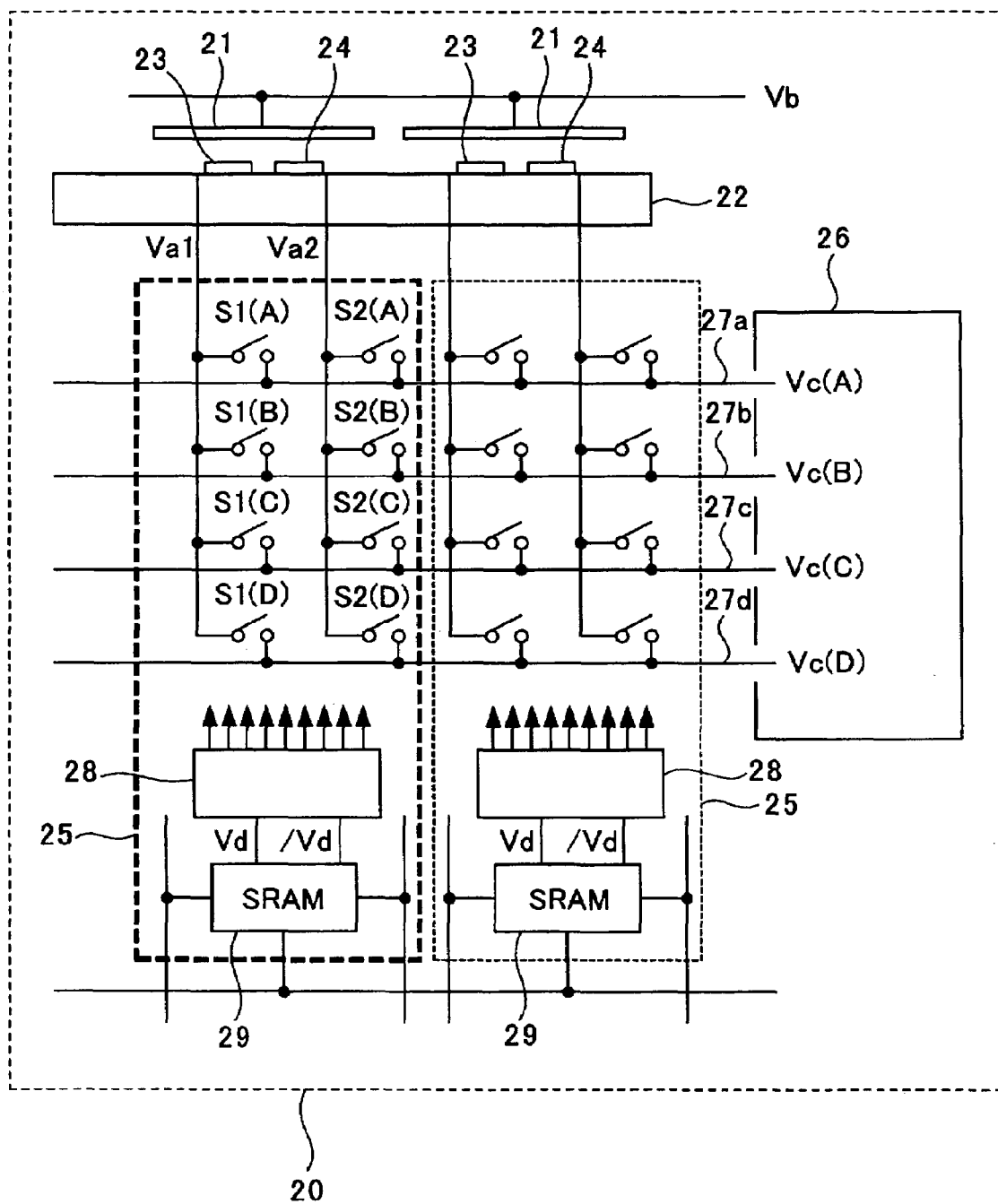
FIG. 1 is a diagram showing the configuration of two elements of a micro-electro-mechanical systems element array device which is an embodiment of the invention.

FIG. 1 is a diagram showing a driving circuit for two elements of a two-dimensional micro-electro-mechanical systems element array device which is an embodiment of the invention. Although the embodiment is an array device in which micro-electro-mechanical systems elements are two-dimensionally arranged, the invention can be similarly applied also to an array device in which micro-electro-mechanical systems elements are one-dimensionally arranged.

Each element of the two-dimensional micro-electro-mechanical systems element array device 20 comprises: a movable mirror 21 (including a configuration in which, as described with reference to FIG. 6, the movable mirror 2 and the movable electrode films 7, 8 are separately configured and integrally moved) to which a bias voltage is applied; stationary electrode films 23, 24 which are formed in a surface portion of a semiconductor substrate 22; and a driving circuit 25 which is disposed correspondingly with the element in the semiconductor substrate 22.

The two-dimensional micro-electro-mechanical systems element array device of the embodiment further comprises a control-voltage generating circuit 26 serving as an electric signal generating unit. The control-voltage generating circuit 26 may be disposed commonly to all the elements. In this case, displacement data are written into memories of all the elements, and then the control-voltage generating circuit 26 generates a control voltage signal in a predetermined sequence for driving the elements.

Alternatively, the control-voltage generating circuit 26 may be disposed for each of blocks of plural rows in an array arrangement, or for each of rows. In the alternative, the apparatus may be configured so that displacement data are written into memories of a memory group in a certain block or row, and then a control voltage signal from the control-voltage generating circuit 26 is applied to a micro-electro-mechanical systems element group of the same block or row in a predetermined sequence for driving the element group. The configurations of the control-voltage generating circuit 26 and the driving circuits 25 which are disposed for each element are not restricted to the above-described ones.

In the above-described example, the control-voltage generating circuit 26 is disposed in the same semiconductor substrate as that in which the micro-electro-mechanical systems element array and the driving circuits 25 are disposed. However, it is more preferable to dispose the control-voltage generating circuit 26 in a semiconductor substrate which is separate from that in which the micro-electro-mechanical systems element array and the driving circuits 25 are disposed. Namely, the control-voltage generating circuit 26 is disposed in a separate substrate and electric signals between the circuits are supplied through wirings on a circuit board. According to the configuration, even when the configuration or characteristic of the micro-electro-mechanical systems element array is changed, it is possible to cope with the change simply by changing the voltage and timing of the control-voltage generating circuit 26 which is separately disposed. Therefore, the degree of freedom and flexibility in design of the elements and apparatus system are improved.

In the embodiment, the control-voltage generating circuit 26 generates four control voltage signals Vc(A), Vc(B), Vc(C), Vc(D), and outputs the control voltage signals respectively to wirings 27a, 27b, 27c, 27d.

The driving circuits 25 comprises: a switch circuit S1(A) through which the wiring 27a is connected/disconnected to/from the stationary electrode film 23; a switch circuit S2(A) through which the wiring 27a is connected/disconnected to/from the stationary electrode film 24; a switch circuit S1(B) through which the wiring 27b is connected/disconnected to/from the stationary electrode film 23; a switch circuit S2(B) through which the wiring 27b is connected/disconnected to/from the stationary electrode film 24; a switch circuit S1(C) through which the wiring 27c is connected/disconnected to/from the stationary electrode film 23; a switch circuit S2(C) through which the wiring 27c is connected/disconnected to/from the stationary electrode film 24; a switch circuit S1(D) through which the wiring 27d is connected/disconnected to/from the stationary electrode film 23; and a switch circuit S2(D) through which the wiring 27d is connected/disconnected to/from the stationary electrode film 24.

The driving circuits 25 further comprises: a selecting circuit 28 which selects one(s) of the switch circuits S1(A) to S1(D) and S2(A) to S2(D) to be "closed", in a manner described below; and a memory circuit (SRAM) 29 into which the displacement data Vd based on an image data or the like is written, and which controls the selection operation of the selecting circuit 28 by the displacement data Vd. The memory circuit 29 is connected to an external circuit (not shown), so that the displacement data Vd consisting of an L (Low) or H (High) signal based on an image data or the like supplied from the external circuit is written into the memory circuit.

Figure 2:
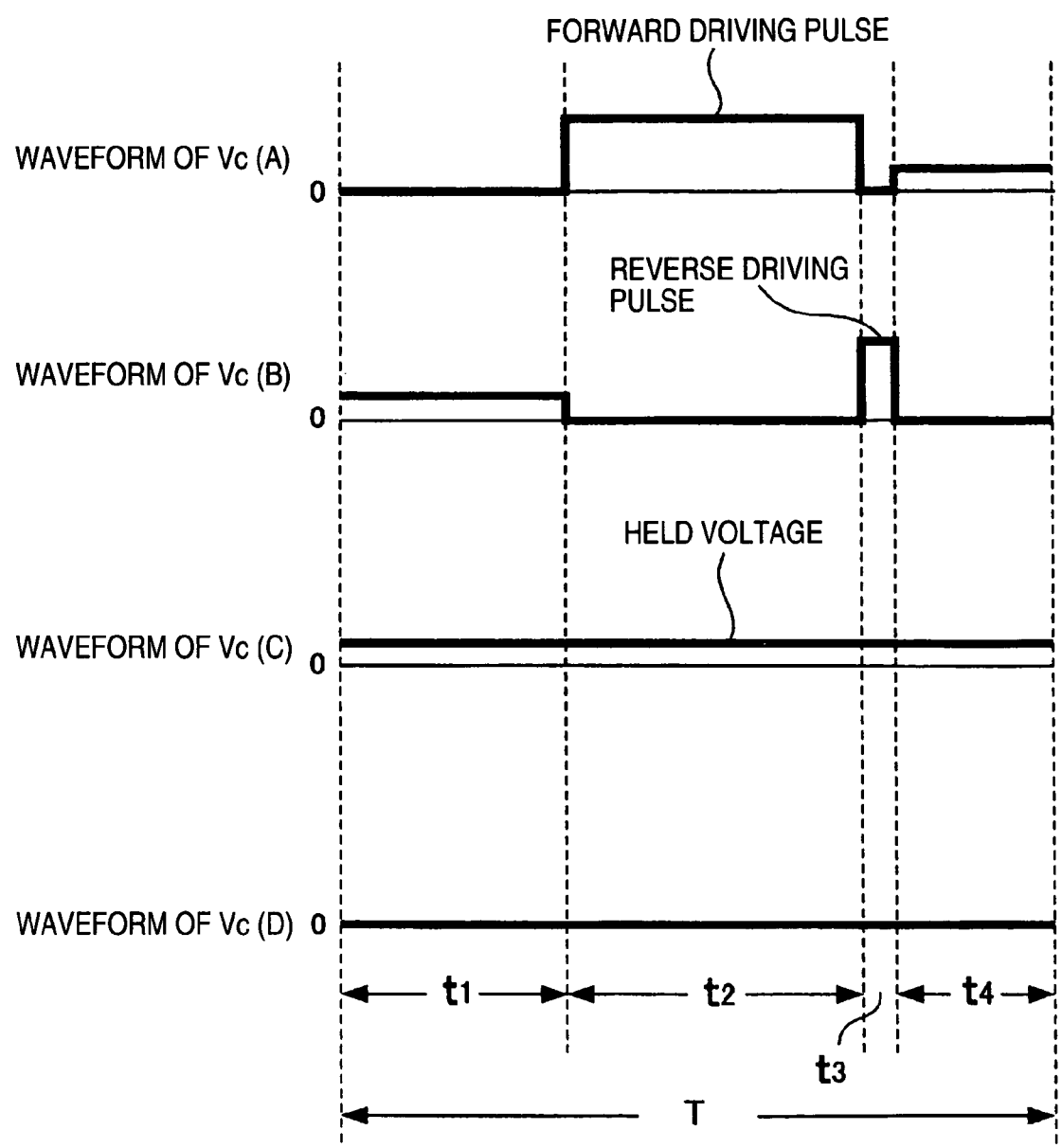
FIG. 2 is a view illustrating four waveforms of a control voltage signal generated by a control-voltage generating circuit shown in FIG. 1.

FIG. 2 is a view showing an example of the four control voltage signals Vc(A), Vc(B), Vc(C), Vc(D) generated by the control-voltage generating circuit 26.

The control voltage signal Vc(A) has a signal waveform in which a 0-level is maintained during the initial or first predetermined time period t1 in a time period T from a signal start timing to a signal end timing, a high-voltage level is set during the next or second predetermined time period t2, the level is returned to the 0-level during the next or third predetermined time period t3 which is short, and a low-voltage level is maintained during the next or fourth predetermined time period t4.

The control voltage signal Vc(B) has a signal waveform in which the low-voltage level is maintained during the initial or first predetermined time period t1, the 0-level is set during the next or second predetermined time period t2, the high-voltage level is set during the third predetermined time period t3, and the 0-level is set during the fourth predetermined time period t4.

The control voltage signal Vc(C) has a signal waveform in which the low-voltage level is maintained over the time period T.

The control voltage signal Vc(D) has a signal waveform in which the 0-level is maintained over the time period T.

The four kinds of signal waveform data are stored in a memory incorporated in the control-voltage generating circuit 26. A driving circuit of the control-voltage generating circuit 26 generates the control voltage signals Vc(A) to Vc(D) based on the corresponding signal waveform data, and outputs the signals to the corresponding wirings 27a to 27d.

Figure 3:
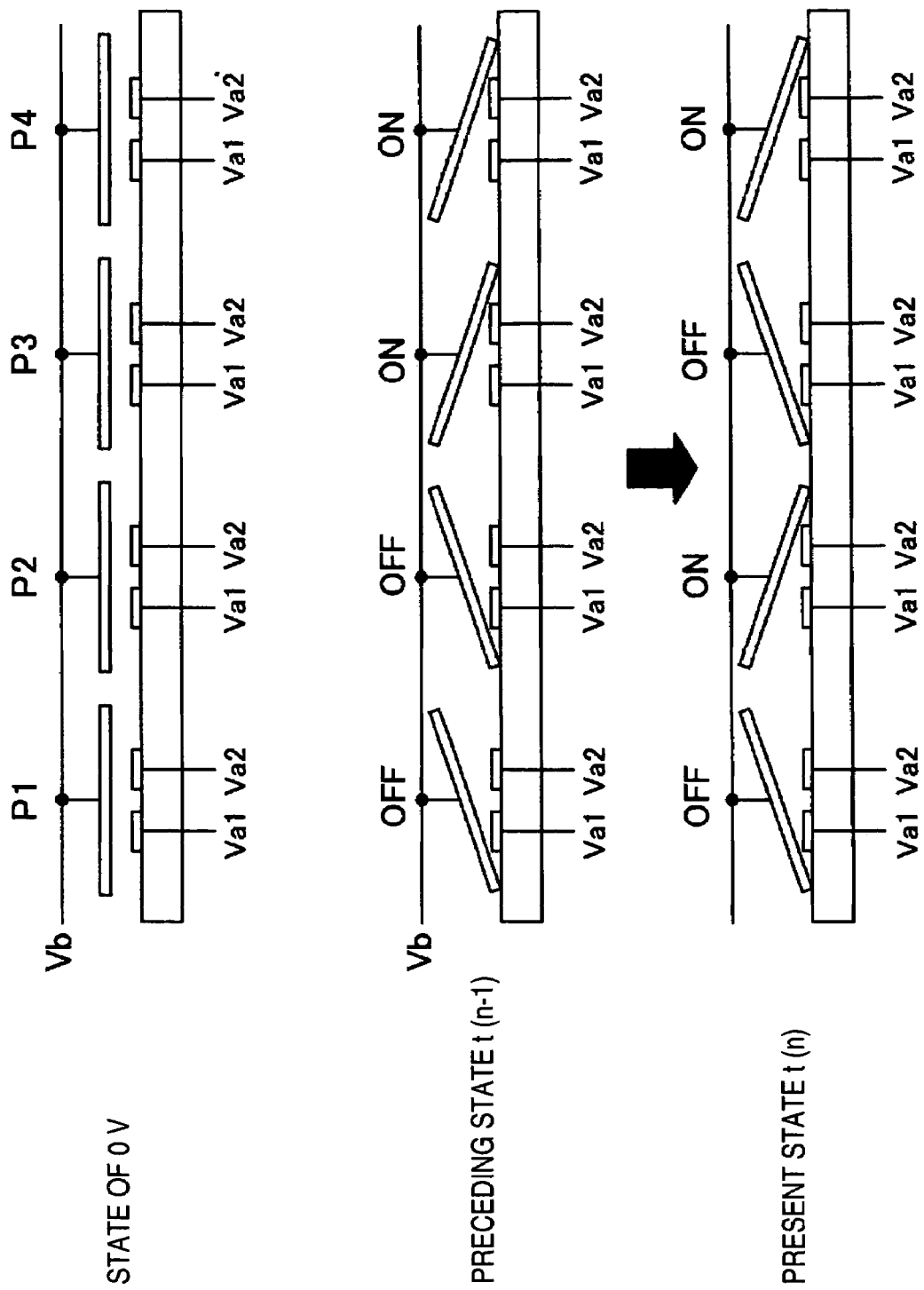
FIG. 3 is a view illustrating four kinds of elements of the micro-electro-mechanical systems element array device shown in FIG. 1.
Figure 8A:
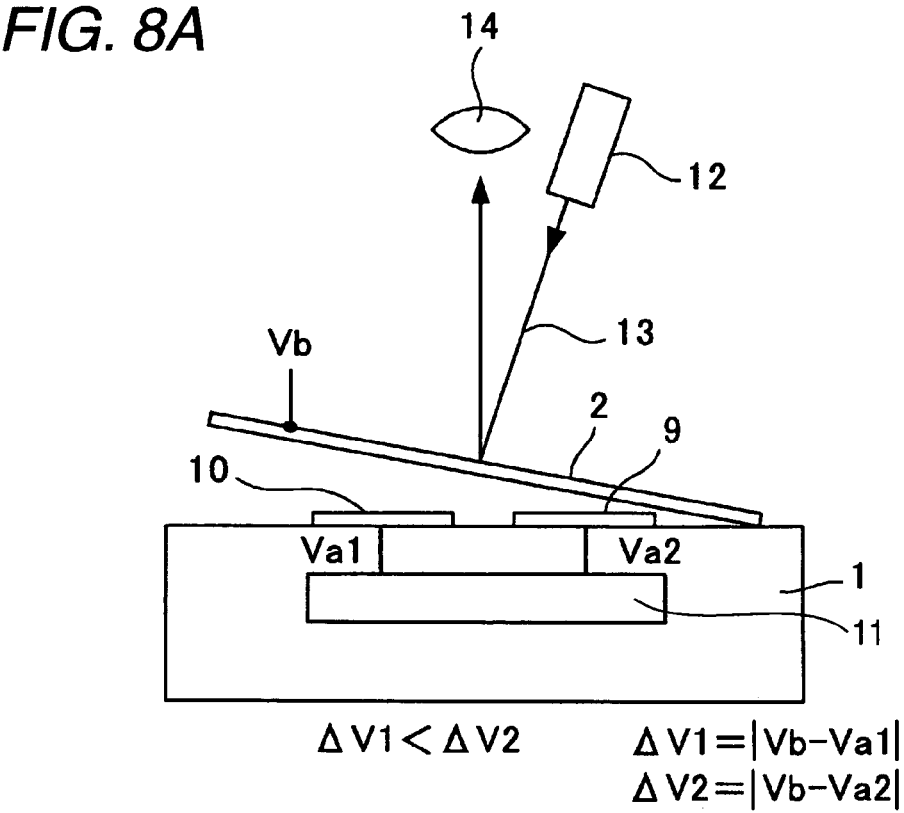
FIG. 8A is a view showing an ON state of the SLM element shown in FIG. 7.
Figure 8B:
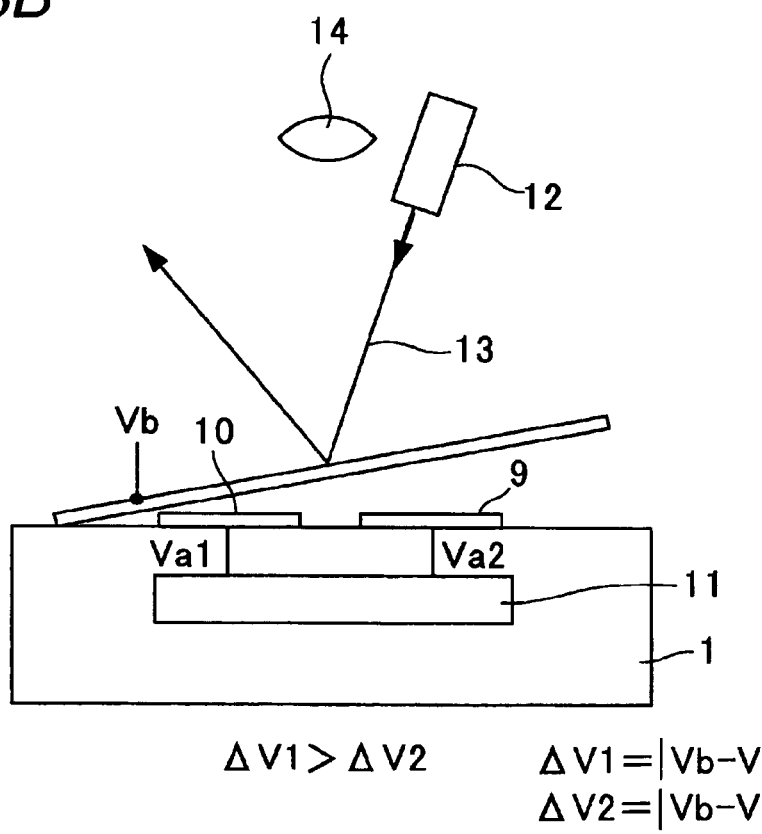
FIG. 8B is a view showing an OFF state of the SLM element shown in FIG. 7.

FIG. 3 is a view illustrating a change of the movable mirror of each element. The bias voltage Vb is applied to the movable mirror, the address voltage Va1 is applied to the stationary electrode film 23 which causes the movable mirror to be left-inclined (in the example, this state is assumed to the OFF state shown in FIG. 8B), and the address voltage Va2 is applied to the stationary electrode film 24 which causes the movable mirror to be right-inclined (in the example, this state is assumed to the ON state shown in FIG. 8A).

All the elements are classified in accordance with the present inclined state t(n) and the immediately preceding state t(n-1). Then, the elements can be classified into four kinds of elements P1, P2, P3, P4. The element P1 is an element in which the OFF (left-inclined) state is changed to the OFF (left-inclined) state, or namely the OFF state is maintained, the element P2 is an element in which the OFF (left-inclined) state is changed to the ON (right-inclined) state, the element P3 is an element in which the ON (right-inclined) state is changed to the OFF (left-inclined) state, and the element P4 is an element in which the ON (right-inclined) state is changed to the ON (right-inclined) state, or namely the ON state is maintained.

FIG. 4 is a view showing a logical table of selection which is performed by the selecting circuit 28. The displacement data (L or H signal) Vd based on an image data or the like is written into the memory circuit 29. The selecting circuit 28 performs the selection shown in FIG. 4, depending on whether the displacement data Vd written into the memory circuit 29 is the L signal or the H signal.

When the previous displacement data Vd based on an image data or the like is the L signal, and also the present displacement data Vd is the L signal, the switch circuits S1(C) and S2(D) are closed, and the other switch circuits are opened. As a result, the control voltage signal Vc(C) is applied to the stationary electrode film 23 as the address voltage Va1 for the concerned element, and the control voltage signal Vc(D) is applied to the stationary electrode film 24 as the address voltage Va2.

Similarly, when the previous displacement data Vd based on an image data or the like is the L signal, and the present displacement data Vd is the H signal, the switch circuits S1(B) and S2(A) are closed, and the other switch circuits are opened. As a result, the control voltage signal Vc(B) is applied to the stationary electrode film 23 as the address voltage Va1 for the concerned element, and the control voltage signal Vc(A) is applied to the stationary electrode film 24 as the address voltage Va2.

Similarly, when the previous displacement data Vd based on an image data or the like is the H signal, and the present displacement data Vd is the L signal, the switch circuits S1(A) and S2(B) are closed, and the other switch circuits are opened. As a result, the control voltage signal Vc(A) is applied to the stationary electrode film 23 as the address voltage Va1 for the concerned element, and the control voltage signal Vc(B) is applied to the stationary electrode film 24 as the address voltage Va2.

Similarly, when the previous displacement data Vd based on an image data or the like is the H signal, and also the present displacement data Vd is the H signal, the switch circuits S1(D) and S2(C) are closed, and the other switch circuits are opened. As a result, the control voltage signal Vc(D) is applied to the stationary electrode film 23 as the address voltage Va1 for the concerned element, and the control voltage signal Vc(C) is applied to the stationary electrode film 24 as the address voltage Va2.

Figure 5:
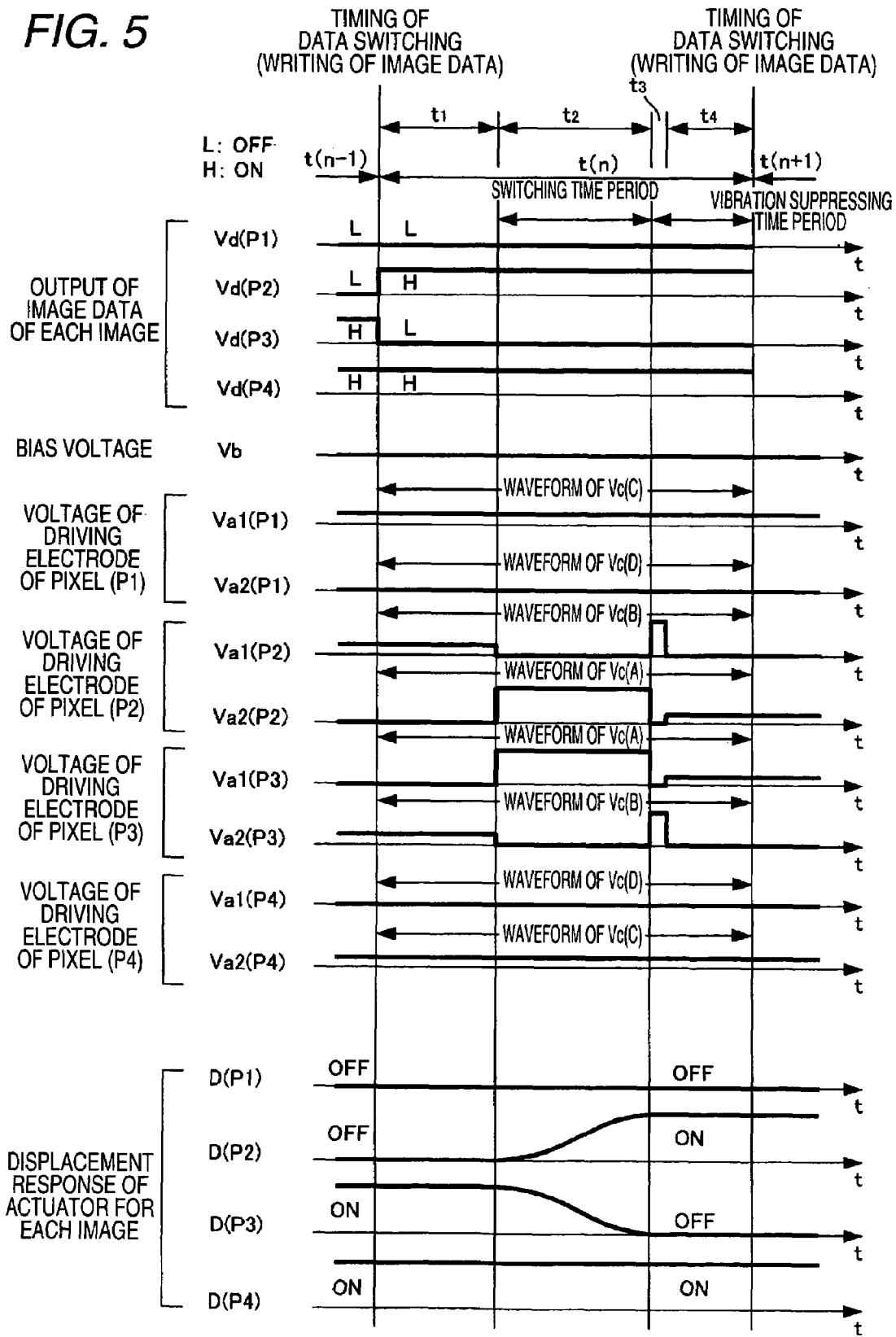
FIG. 5 is a timing chart illustrating the operation of the micro-electro-mechanical systems element array device shown in FIG. 1.

FIG. 5 is a timing chart illustrating the operation of the micro-electro-mechanical systems element array device of the embodiment. In the embodiment, 0 V is always applied as the bias voltage Vb.

The element P1 which has been described with reference to FIG. 3 is an element which maintains the OFF (left-inclined) state. In this case, both the previous and present displacement data Vd are the L signal. In the element P1, therefore, the control voltage signal Vc(C) is applied to the stationary electrode film 23 as the address voltage Va1, and the control voltage signal Vc(D) is applied to the stationary electrode film 24 as the address voltage Va2.

The element P1 is in the left-inclined state, the gap between the movable mirror 21 (FIG. 1) and the left stationary electrode film 23 is narrowed, the bias voltage Vb is 0 V, the address voltage Va1 is in the low-voltage level, and the address voltage Va2 is 0 V. Therefore, an electrostatic attracting force which is due to the potential difference between the left stationary electrode film 23 and the movable mirror 21, and which holds the movable mirror 21 to the left-inclined state acts on the mirror, and the left-inclined (OFF) state is maintained.

The element P2 which has been described with reference to FIG. 3 is an element in which the OFF (left-inclined) state is changed to the ON (right-inclined) state. In this case, the previous displacement data Vd is the L signal, and the present displacement data Vd is the H signal. In the element P2, therefore, the control voltage signal Vc(B) is applied to the stationary electrode film 23 as the address voltage Va1, and the control voltage signal Vc(A) is applied to the stationary electrode film 24 as the address voltage Va2.

In the first predetermined time period t1 (initial time period) after the displacement data Vd which is written into the memory circuit 29 is rewritten, the potential difference between the bias voltage Vb of the movable mirror 21 and the address voltage Va1 of the left stationary electrode film 23 is larger than that between the movable mirror 21 and the address voltage Va2 of the right stationary electrode film 24. Therefore, the left-inclined state of the movable mirror 21 is maintained. At this time, the voltage applied to the element is equal to that in the preceding state. Therefore, the movable mirror does not produce vibrations due to an unwanted voltage, and stably maintains the state. Accordingly, contrast of an optical system is not lowered.

In the next or second predetermined time period t2 (switching time period), the voltage Va1 applied to the left stationary electrode film 23 is 0 V, and equal to the bias voltage Vb of the movable mirror 21. Therefore, the electrostatic attracting force acting between the both vanishes. In the opposite side, the voltage Va2 applied to the right stationary electrode film 24 is high, and the potential difference between the film and the movable mirror 21 is large, so that a large electrostatic attracting force which causes the movable mirror 21 to be right-inclined is generated between the movable mirror 21 and the right stationary electrode film 24. Therefore, the movable mirror 21 starts to swing so as to attain the right-inclined state. While using the second predetermined time period t2 as the switching time period, the movable mirror 21 is changed from the left-inclined state to the right-inclined state.

In the next or third predetermined time period t3 which is short (vibration suppression pulse time period during the vibration suppressing time period), the voltage applied to the right stationary electrode film 24 is 0 V, and equal to the bias voltage Vb of the movable mirror 21. Therefore, the voltage applied to the left stationary electrode film 23 becomes higher, and a large electrostatic attracting force which causes the movable mirror 21 to be left-inclined is temporarily generated.

The end of the switching time period t2 is an instance when the tip end of the movable mirror 21 which is being right-inclined bumps against the surface of the semiconductor substrate 22 and lands thereon. At this time, when a large electrostatic attracting force which causes the movable mirror 21 to be inclined in the opposite direction or left-inclined is temporarily generated, the tip end of the movable mirror 21 which is being right-inclined soft-lands on the surface of the semiconductor substrate 22.

The next or fourth predetermined time period t4 is a stabilizing time period of the vibration suppressing time period. During a period until vibrations of the movable mirror 21 which soft-lands on the surface of the semiconductor substrate 22 settle down, the voltage applied to the left stationary electrode film 23 is set to the 0-level, or to the same level as that applied to the movable mirror 21, and the voltage applied to the right stationary electrode film 24 is maintained to the low-voltage level. Therefore, an electrostatic attracting force which maintains the movable mirror 21 to the right-inclined state is generated in the movable mirror, and the right-inclined state is maintained.

The element P3 which has been described with reference to FIG. 3 is an element in which the ON (right-inclined) state is changed to the OFF (left-inclined) state. In this case, the previous displacement data Vd is the H signal, and the present displacement data Vd is the L signal. In the element P3, therefore, the control voltage signal Vc(A) is applied to the stationary electrode film 23 as the address voltage Va1, and the control voltage signal Vc(B) is applied to the stationary electrode film 24 as the address voltage Va2. As a result, the element P3 operates in a manner which is laterally opposite to the above-described operation of the element P2, and the right-inclined state is changed to the left-inclined state. In the same manner as the element P2, the control voltage signal which suppresses vibrations is applied.

The element P4 which has been described with reference to FIG. 3 is an element which maintains the ON (right-inclined) state. In this case, both the previous and present displacement data Vd are the H signal. In the element P4, therefore, the control voltage signal Vc(D) is applied to the stationary electrode film 23 as the address voltage Va1, and the control voltage signal Vc(C) is applied to the stationary electrode film 24 as the address voltage Va2. As a result, the element P4 operates in a manner which is laterally opposite to the above-described operation of the element P1, and the right-inclined state is maintained. In the same manner as the element P1, vibrations due to an unwanted voltage are not produced.

As described above, according to the embodiment, individual operations of the many elements can be unitedly controlled by the signal waveform which is set in the control-voltage generating circuit 26 disposed commonly to the elements. Even in an array device having many elements, therefore, a united and uniform control is facilitated.

Figure 6:
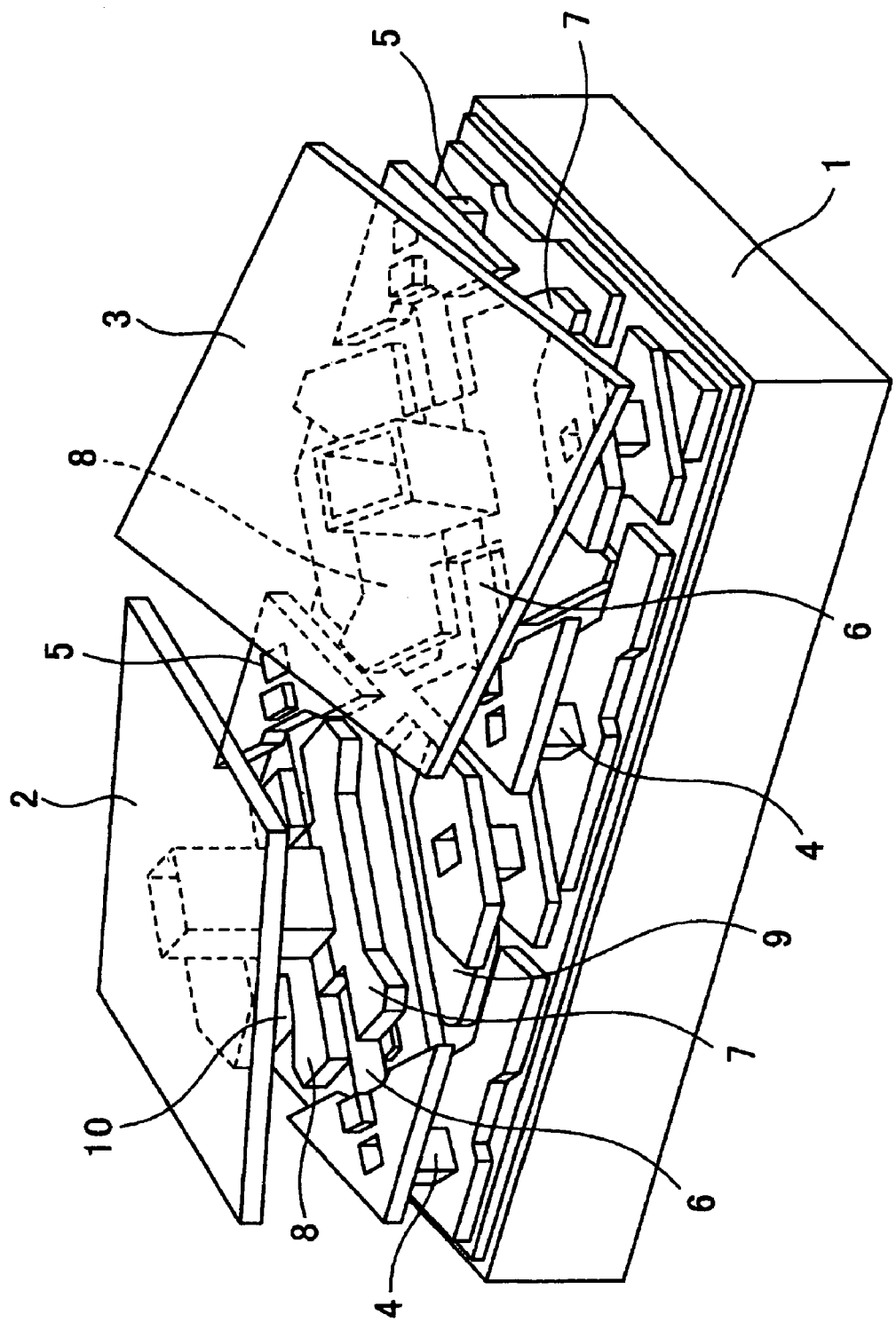
FIG. 6 is a perspective view of two elements of a rotational displacement SLM element array which is an example of a two-dimensional micro-electro-mechanical systems element array device.
Figure 7:
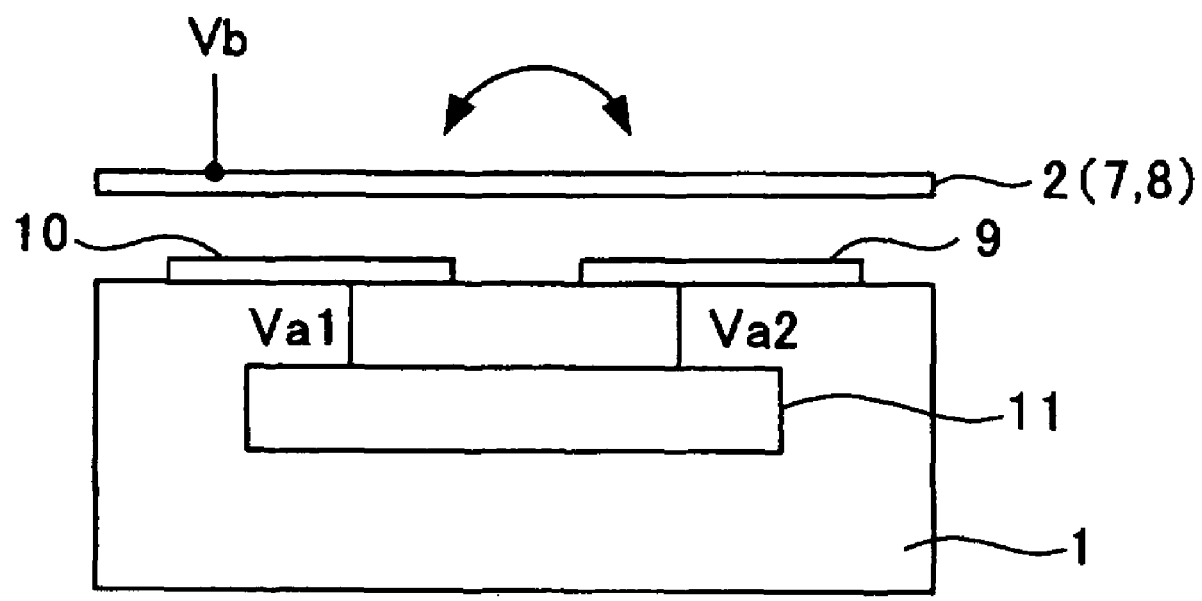
FIG. 7 is a diagram of the rotational displacement SLM element shown in FIG. 6.

In the above embodiment, the MEMS element which is of the electrostatic type and rotational displacement type, and which is typified by an SLM element has been described. The invention may be applied to a usual MEMS element of the electromagnet type or the vertical displacement type. In the above embodiment, the example in which, as shown in FIG. 6, the both ends of the movable mirror are supported respectively by the hinges has been described. The invention may be applied also to a MEMS element in which a displacement member is cantilevered by a hinge.

In the above embodiment, the control voltage signal shown in FIG. 2 is used, and a physical force (an electrostatic attracting force because the element is of the electrostatic type, or an electromagnetic force in the case of the electromagnet type) is applied in the opposite direction immediately before the changing movable mirror bumps against the surface of the semiconductor substrate, thereby preventing vibrations from being produced. As far as a micro-electro-mechanical systems element array device in which, as a driving signal waveform that is supplied to each element, and that is based on a displacement data, an arbitrary driving signal can be applied at an arbitrary timing, the element configuration, the switch circuits, the selecting circuits, the control-voltage generating circuit, and the time sequences of these components are not restricted to above-described ones.

In the micro-electro-mechanical systems element array device of the invention, it is easy to unitedly control many elements. Therefore, the device is useful as a micro-electro-mechanical systems element array device such as: an optical modulation element array which is to be used in an on-demand digital exposure apparatus used in a photolithography step, an image forming apparatus such as a printing apparatus due to digital exposure, a projection display apparatus such as a projector, or a micro-display apparatus such as a head-mount display; an optical switching element array which is to be used in a cross-connector for optical communication, or the like; and a micro-electric switching element array which is to be used in an RF circuit or a multiplexer for multichannel signals.

What is claimed is:

1. A micro-electro-mechanical systems element array device in which plural micro-electro-mechanical systems elements each having a movable portion are arranged in an array, said movable portion being to be displaced by a physical force which is generated by applying an electric signal to a conductive portion, and each of said micro-electro-mechanical systems elements drives and displaces said movable portion of said micro-electro-mechanical systems element on the basis of a displacement data for said micro-electro-mechanical systems element, wherein said device comprises: an electric signal generating unit which is disposed commonly to said micro-electro-mechanical systems elements; a switching unit disposed for each of said micro-electro-mechanical systems elements, said switching unit being for connecting said electric signal generating unit to said conductive portion of said micro-electro-mechanical systems element and for disconnecting said electric signal generating unit from said conductive portion of said micro-electro-mechanical systems element; and a selecting unit disposed for each of said micro-electro-mechanical systems elements, said selecting unit being for opening and closing said switching unit on the basis of the displacement data, so as to apply the electric signal from said electric signal generating unit to said conductive portion through said closed switching unit.

2. The micro-electro-mechanical systems element array device according to claim 1, wherein said conductive portion comprises a first conductive portion for generating a physical force for displacing said movable portion to a first position, and a second conductive portion for generating a physical force for displacing said movable portion to a second position, and said switching unit comprises a first switching unit for connecting said first conductive portion to said electric signal generating unit and for disconnecting said first conductive portion from said electric signal generating unit, and a second switching unit for connecting said second conductive portion to said electric signal generating unit and disconnecting said second conductive portion from said electric signal generating unit.

3. The micro-electro-mechanical systems element array device according to claim 2, wherein the switching unit comprises a first plurality of switching circuits connected to the first conductor portion and a second plurality of switching circuits connected to the second conductor portion, wherein the selecting unit selects a first switching circuit from the first plurality of switching circuits and a second switching circuit from the second plurality of switching circuits.

4. The micro-electro-mechanical systems element array device according to claim 3, wherein each of the switching circuits of the first plurality of switching circuit corresponds to a different control voltage of the plural different control voltage.

5. The micro-electro-mechanical systems element array device according to claim 3, wherein each of the switching circuits of the second plurality of switching circuit corresponds to a different control voltage of the plural different control voltage.

6. The micro-electro-mechanical systems element array device according to claim 2, wherein said electric signal generating unit generates plural different control voltage signals, and applies the different control voltage signals to said first and second conductive portions.

7. The micro-electro-mechanical systems element array device according to claim 6, wherein the plural different control voltage signals comprises:
   a first signal waveform comprising a 0-level during a first time period, a high-voltage level during a second time period, a 0-level during a third time period, and a low-voltage level during a fourth time period;
   a signal waveform comprising a low-voltage level during a first time period, a 0-level during the second time period, a high-voltage level during the third time period, and the 0-level during the fourth time period;
   a third signal waveform which maintains a low-voltage level over an entire time period; and
   a fourth signal waveform which maintains the 0-level over an entire time period.

8. The micro-electro-mechanical systems element array device according to claim 6, wherein the control voltage signals have a signal waveform which suppresses vibration that is produced by said movable portion at said second position or said first position when said movable portion is displaced from said first position to said second position, or from said second position to said first position.

9. The micro-electro-mechanical systems element array device according to claim 1, wherein the physical force is an electrostatic force or an electromagnetic force.

10. The micro-electro-mechanical systems element array device according to claim 1, wherein the displacement data is an image data.

11. The micro-electro-mechanical systems element array device according to claim 1, wherein said micro-electro-mechanical systems elements are optical modulation elements.

12. The micro-electro-mechanical systems element array device according to claim 1, wherein said electric signal generating unit is disposed commonly to at least micro-electro-mechanical systems elements of a same row.

13. An image forming apparatus which comprises the micro-electro-mechanical systems element array device according to claim 1.

14. A micro-electro-mechanical systems element array device in which plural micro-electro-mechanical systems elements each having a movable portion are arranged in an array, said movable portion being to be displaced by a physical force which is generated by applying an electric signal to a conductive portion, and each of said micro-electro-mechanical systems elements drives and displaces said movable portion of said micro-electro-mechanical systems element on the basis of a displacement data for, said micro-electro-mechanical systems element, wherein said device comprises:
   an electric signal generating unit which is disposed commonly to said micro-electro-mechanical systems elements;
   a switching unit disposed for each of said micro-electro-mechanical systems elements, said switching unit being for connecting said electric signal generating unit to said conductive portion of said micro-electro-mechanical systems element and for disconnecting said electric signal generating unit from said conductive portion of said micro-electro-mechanical systems element,
      wherein said conductive portion comprises a first conductive portion for generating a physical force for displacing said movable portion to a first position, and a second conductive portion for generating a physical force for displacing said movable portion to a second position, and said switching unit comprises a first switching unit for connecting said first conductive portion to said electric signal generating unit and for disconnecting said first conductive portion from said electric signal generating unit, and a second switching unit for connecting said second conductive portion to said electric signal generating unit and disconnecting said second conductive portion from said electric signal generating unit;
   a selecting unit disposed for each of said micro-electro-mechanical systems elements, said selecting unit being for opening and closing said switching unit on the basis of the displacement data, so as to apply the electric signal from said electric signal generating unit to said conductive portion through said closed switching unit,
      wherein said electric signal generating unit generates plural different control voltage signals, and applies the different control voltage signals to said first and second conductive portions, and
      wherein the control voltage signals have a signal waveform which suppresses vibration that is produced by said movable portion at said second position or said first position when said movable portion is displaced from said first position to said second position, or from said second position to said first position.

* * * * *